United States Patent Office 3,573,968
Patented Apr. 6, 1971

3,573,968
PROCESS FOR COATING SOLID SUBSTRATES WITH PARA-XYLYLENE POLYMERS
William E. Loeb, Martinsville, and Harold B. Robinson, Jr., Chatham Township, N.J., assignors to Union Carbide Corporation
No Drawing. Filed Jan. 22, 1968, Ser. No. 699,316
Int. Cl. C23c 13/04
U.S. Cl. 111—106                                                8 Claims

ABSTRACT OF THE DISCLOSURE

Para-xylylene polymer coated substrates exhibiting strong polymer-substrate interfacial bonds are obtained by deposition coating the substrates to a para-xylylene polymer thickness of up to about 5 microns and thereafter maintaining the coated substrate at a temperature of from 100 to 200° C. for at least 0.25 hour.

BACKGROUND OF THE INVENTION

The advent of the linear poly-p-xylylene family of polymers has promised new vistas in thin film polymer coating and encapsulation technology which can be readily appreciated from a general consideration of the mechanism of their formation.

Poly-p-xylylene polymers are readily formed by the simultaneous condensation polymerization of high temperature pyrolyzed vaporous p-xylylene diradicals at a diradical partial pressure below about 1.0 mm. Hg at the surface of a relatively cool substrate. Since the reaction at the surface is essentially molecular in nature, the forming polymer will naturally tend to conform to the surface character of the substrate. Since film thickness may be so controlled to be essentially a function of substrate residence time, coatings of various thicknesses are readily obtainable. It is evident then, that this deposition technique is readily adapted to the formation of extremely thin films. In particular, thin films in the order of 0.1 micron or less may be deposited without sacrificing the excellent physical, chemical, electrical and thermal properties of these unique polymers.

The fact that poly-p-xylylene polymers readily form at the surface of a cooled substrate does not, however, promise a tenacious bond. Rather, a substrate only promises to provide a heat sink to support the simultaneous condensation-polymerization reaction not active bonding sites. While some materials of construction do offer excellent bonding sites, others are reluctant to form strong bonds to the condensed polymer. Although primers and adhesives offer a solution to improving bond strength, it is evident that where thin polymer films are to be obtained, primers and adhesives are undesirable since their thickness can easily exceed the desired thickness of the condensed polymer. A more radical solution to improving bond strength of thin films therefore seemed necessary.

SUMMARY OF THE INVENTION

It has now been found that para-xylylene polymer coated substrates which exhibit strong polymer-substrate interfacial bonds can be obtained by a process which comprises condensing vaporous para-xylylene diradicals onto a solid substrate surface maintained at a temperature below 200° C. while maintaining diradicals partial pressure below 1 mm. Hg for a period of time sufficient to form a linear para-xylylene polymer coating of a thickness up to about 5 microns and thereafter maintaining the para-xylylene polymer coated substrate at a temperature

DESCRIPTION

This invention relates to an improved process for obtaining the adhesion of thin film para-xylylene polymer coated substrates which exhibit strong polymer-substrate interfacial bonds.

The para-xylylene polymer to which this invention relates are unsubstituted and substituted linear homopolymers and copolymers disclosed particularly in U.S. Pat. 3,288,720 and U.S. Pat. 3,342,754 to Gorham, U.S. Pat. 3,235,516 to Leonard, U.S. Pat. 3,297,591 to Chow and U.S. Pat. 3,332,891 to Chow and Pilato which are incorporated herein by reference.

The para-xylylene polymers disclosed in the aforementioned U.S. patents have been established to form on a substrate through a mechanism which involves three general stages. In the first stage, a starting material which is preferably a cyclic dimer is vaporized. In the second stage, the vaporized dimer is heated to a temperature between about 450° C. to 700° C. where the starting material pyrolyses and cleaves to form vaporous para-xylylene diradicals which retain the same degree of substitution as the starting material. While maintaining diradical partial pressure below 1.0 mm. Hg the diradicals will simultaneously condense and polymerize in the third stage onto any relatively cool substrate maintained at a temperature below about 200° C. at a rate which is dependent on some inverse logarithmic function of substrate temperature to form clear, tough linear polymers which exhibit excellent physical, chemical, electrical and thermal properties.

In this technique, coupling of these diradicals into polymers involves such low activation energy and the chain propagation shows little or no preference as to the particular diradical, so that steric and electronic effects are not important as they are in vinyl polymerization.

While condensation of the diradicals onto a surface occurs at temperatures below 200° C., as mentioned above, the rate of condensation increases with a decrease in substrate temperature. In particular, the rate of condensation is greatest where the substrate is at a temperature below the ceiling condensation temperature of at least one of the vaporous diradicals species present. At 0.5 mm. Hg pressure for instance, the following ceiling condensation temperatures are obtained for the following diradicals:

|  | Degrees, centigrade |
|---|---|
| p-Xylylene | 25–30 |
| α-Perfluoro-p-xylylene | 30–40 |
| Chloro-p-xylylene | 70–80 |
| Ethyl-p-xylylene | 70–80 |
| 2 cyano-p-xylylene | 120–130 |
| N-butyl-p-xylylene | 130–140 |
| Bromo-p-xylylene | 130–140 |
| Acetyl-p-xylylene | 130–140 |
| Carbomethoxy-p-xylylene | 130–140 |
| Dichloro-p-xylylene | 130–140 |
| 2 iodo-p-xylylene | 180–200 |

Inasmuch as the coupling of these reactive diradicals does not involve the aromatic ring, and the nuclear substituents do not become involved in nor affect the chain propagation, any unsubstituted or nuclear substituted paraxylylene polymer can be prepared since the substituent groups function essentially as inert groups. Thus, the substituent group can be any organic or inorganic group which can normally be found or substituted on aromatic nuclei. As an illustration of such substituent groups are hydrocarbons, oxyhydrocarbons, thiohydrocarbons, hydroxyl, halogen, nitro, nitrile, amine, mercapto, and like groups as is illustrated by such groups as methyl, ethyl, propyl, butyl, hexyl, alkenyls like vinyl, aryls for example phenyl, naphthyl, substituted phenyl such as halophenyl, alkylphenyl groups, as well as alkoxy groups like methoxy, ethoxy, propoxy, etc., hydroxyalkyl groups such as hydroxymethyl, hydroxyethyl and the like, carboxyl, carboxylalkyl such as carbomethoxy, carboethoxy and the like, acyl groups such as acetyl, propionyl, butyryl and the like as well as cyanoalkyl groups, and similar organic radicals as well as the above recited inorganic groups and halogens such as chlorine, bromine, fluorine and iodine. However, such listing is not exhaustive of substituent groups but is only illustrative of the broad scope of this invention.

Particularly preferred of the aromatic substituted groups are those simple hydrocarbon groups such as the lower alkyls as methyl, ethyl, propyl, butyl, hexyl, lower aryl hydrocarbons such as phenyl, alkylated phenyl, naphthyl, alicyclic groups such as cyclohexyl, aralkyl groups such as benzyl, and like groups having no more than about 10 carbon atoms, and the halogen groups particularly chlorine and bromine.

Where several different diradicals exist in the pyrolyzed mixture and two or more have essentially the same vapor pressure and condensation characteristics, homopolymers cannot be made inasmuch as the coupling mechanism is not specific to particular substituted species and random copolymers of the several species will result.

However where several different diradicals existing in the pyrolyzed mixture have different vapor pressure and condensation characteristics, homopolymerization can be favored when the condensation and polymerization temperature is selected to be at or below the temperature where only one of the diradicals condense and polymerize rapidly. By the same analysis, copolymers will be favored if the substrate is at a temperature below the ceiling condensation temperature of all species present.

If desired, more than one homopolymer may be prepared by providing a plurality of polymerization zones, one for each diradical specie, and each zone being maintained at a temperature below the ceiling condensation temperature of a particular diradical specie but above the ceiling condensation temperature of all other diradical species present in the vaporous mixture.

In this process, the reactive diradicals are prepared by pyrolyzing one or more of the monomers at a temperature less than about 700° C., and preferably at a temperature between about 550° C. to about 600° C. At such temperatures, essentially quantitative yields of the reactive diradical are secured. Pyrolysis begins at about 450° C. regardless of the pressure employed. Operation in the range of 450°–550° C. serves only to increase time of reaction and lessen the yields of polymer secured. At temperatures above about 700° C., cleavage of the substituent group can occur, resulting in a tri/or poly-functional species causing cross-linking of highly branched polymers.

Pyrolysis temperature is nearly independent of the system operating pressure. It is however preferred that reduced or subatmospheric system pressures be employed. For most operations, system pressure within the range of 0.001 to 10 mm. Hg is most practical. However if desired, greater pressures can be employed by using inert vaporous diluents such as nitrogen, argon, carbon dioxide, steam and the like which can either vary the optimum temperature of operation or change the total effective pressure in the system. In fact essentially quantitative yields of clear, tough linear polymers is secured at system pressures up to atmospheric as long as the diradical partial pressure is maintained below 1.0 mm pressure Polymer quality is dependent on diradical partial pressure in the condensation zone. Deposition at or above 1.0 mm. partial pressure has been found to yield yellow, highly fluorescent polymers with impaired physical properties containing stilbene moieties and/or substantial cross-linking. As the partial pressure is reduced below 1.0 mm., polymer quality as measured by color, transparency and fluorescence is remarkably improved. At a pressure of 0.75 mm. the polymer is free of fluorescence and acceptable in quality although slightly yellow whereas at a pressure of 0.5 mm. or less the quality is excellent with no color or fluorescence, and is strong and flexible.

Because of such pressure sensitivity, common U-tube mercury manometers, which are virtually impossible to read with accuracy below 1.0 mm. are recommended only for indicating system pressure. Even though the diradical is a condensible gas, thermocouple gauges for measuring the partial pressures can be used and are recommended, if heated to prevent deposition of polymer on the filaments. Preferably, though not always necessary, the heated thermocouple gauge can be calibrated against a McCleod gauge to relate the true partial pressure of the diradicals.

As mentioned above, although any cooled substrate of low vapor pressure will support the condensation-polymerization reaction, the degree of bonding to a substrate has been observed to vary considerably with the nature of the paraxylylene polymer and the nature of the substrate. Glass for instance exhibits a high resistance to forming strong interfacial bonds with the condensed polymer. It was surprisingly and unexpectedly found however that the adhesion of an unsubstituted poly-p-xylylene to glass was substantially improved after deposition by heating the coated glass sample to 175° C. in air for about 30 minutes.

Improved interfacial was established through the use of a tape test. In this test, "Scotch" brand cellophane tape was applied over a "cross-hatched" score on the polymeric coating and rapidly ripped therefrom to exert maximum stress on the polymer coating. Where this test would normally cause the polymer coating to lift from the glass, the polymer coating was not disturbed.

Since the result was most surprising and unexpected, the parameters associated with the phenomenon were carefully exploded. Several factors were found influence the effect of post-deposition heating on bond strength.

Optimum bond strengths were found to be time-temperature dependent. More specifically, the time required to optimize interfacial bond strength was found to be proportioned to film thickness and inversely proportioned to temperature. Films in the order of about 0.2 micron or less generally required heating for only a short time to achieve optimum bond strength while thicker films required slightly more time at a given temperature.

As a general guide, it was established that for a mean film thickness in the order of about 2.0 microns, optimum bond strengths were obtained for times ranging from about 2.5 hours at 100° C., to about 1.5 hours at 150° C., to about 1 hour at 175° C. to a minimum of about 0.25 hour at 200° C. Variations in these schedules were, of course, observed for various polymers and as mentioned above, post-deposition heating time at a given temperature increased slightly as film thickness increased and decreased slightly as film thickness decreased.

Post-deposition heating atmosphere is also an influencing factor. In the presence of air, heating unsubstituted poly-p-xylylene for 1 hour at 175° C. produced an increase in absorption in the 260–340$\mu$ region of the ultraviolet spectrum which indicated that some side chain oxidation occurred. While heating in an inert or non-oxidizing atmosphere such as nitrogen, argon or the like eliminated this problem, heating at a reduced pressure, namely in a vacuum was even better and is favored where feasible. In particular, heating in a vacuum of 0.01 mm. Hg or less is preferred with heating in a vacuum of 0.001 mm. Hg or less even more preferred.

It was also observed that chemical modification of substituted para-xylylene polymers can occur. Side chain chlorinated poly-p-xylylenes for instances were observed to dehydrochlorinate on heating. However, the desired improvement in adhesion was still observed.

The most critical factor, however, was the thickness of the polymer film. The adhesion of thin films of about 0.2 micron or less in thickness readily improved with only a short heating period. As film thickness increased, however, it became more difficult to improve adhesion and at a film thickness of about 5 microns, the effect of post-deposition heating became negligible. It was interesting to note since post-deposition heating to improve adhesion proved most effective for thin films where adhesives and primers are to be avoided.

It was also found that cleaning the substrate prior to depositing the para-xylylene polymer film was important. The presence of any foreign substance on the substrate which per se had lower adhesivity to the para-xylylene polymer was observed to reduce the overall improvement in adhesion through post-deposition heating. Optimum adhesion to glass for instance required cleaning with ammonia to a "clear water break" where water will form a uniform film on the surface. Metals such as aluminum, copper, steel and the like should be degreased by rinsing in acetone or vapor degreased with trichloroethylene.

It was observed however that substrate did not have to be degassed prior to deposition. In fact, an improvement in adhesion through post-deposition heating occurred without removal of any substantial amount of gas or vapor previously absorbed on the surface of the substrate.

Although it is not critical to heat the para-xylylene polymer coated substrate immediately after deposition, certain advantages can be seen in having the steps occur sequentially.

In a batch operation, a paramount advantage resides in performing the heating step in the same chamber where deposition took place. Since deposition occurs at a reduced pressure, one can perform the heating step without loosing the vacuum drawn by conveniently extinguishing the supply of vaporous dimer to the deposition zone, reducing pressure to the desired vacuum and heating the para-xylylene polymer coated substrate in situ.

Where a continuous coating process is practiced, the coated substrate can be conveyed from a deposition zone wherein the vaporous diradicals are contained by a gas barrier or lock into an adjacent yet isolated heating zone such as a vacuum oven wherein the coated substrates may be continuously heated for a period of time to improve interfacial bond strengths.

In another alternate, the coated substrates can be removed from deposition chamber and selectively heated at a latter time to obtain improved interfacial bond strengths.

While not bound by theory, it is believed that improved in adhesion results from the ability of the randomly deposited polymer chains to attain closer contact with the surface of the substrate whereby molecular forces such as the van der Walls forces of attraction come into play and become more significant in their contribution to bond strength. This in part explains why post-deposition heating according to the practice of this invention becomes less effective as film thickness increases. The post-deposition heating operation according to this invention does not involve a true melting step and since molecular fluidity through melting does not occur, the ability of the molecules to adjust their position at an interface is retarded as the number of molecular layers contributing to film thickness increases. Thus, any tendency of molecules at the interface to conform closer to the substrate is impeded by competing intermolecular forces within the film which increase with film thickness.

It will be understood that while the practice of this invention is limited to improving the interfacial bond strengths of the solid substrates coated to a polymer thickness of about 5 microns or less, heavier coatings can be realized by reinstituting deposition after the heating step. In this way the improved adhesion initially obtained by post-deposition heating will be shared by layers of para-xylylene polymers subsequently applied to the coated substrates of this invention.

Example 1

A number of glass samples were deposition coated with an unsubstituted poly-p-xylene polymer to a thickness which ranged from 0.3 to 0.4 micron. One sample was retained as a control while the others were heated for 1.5 hours at 175° C. The control and each baked sample were scored with cross-hatched mark and "Scotch" brand cellophane tape applied over scratch and rapidly removed to exert maximum stress on the deposited film.

Polymer adhesion of each baked sample was judged excellent in that removing the tape did not disturb the deposited polymer film. Adhesion to control sample, however, was judged poor in that lifting the tape caused complete removal of the deposited polymer layer from the glass substrate.

Example 2

The procedure of Example 1 was repeated several times varying the thickness of the deposited polymer layer. Thicknesses of the coatings ranged from 0.25 to 2.5 microns. After being baked for 1.5 hours at 175° C., adhesion to all samples was judged excellent.

Example 3

The procedure of Example 1 was repeated using quartz as the substrate. Poly-p-xylylene was deposited on samples to a thickness of from 0.28 to 0.39 micron. Adhesion prior to baking was found to be poor.

Some of the samples were baked in air at 175° C. for 2 hours while others were baked in sealed nitrogen filled tubes for an equivalent time. Adhesion of both air and nitrogen baked samples was excellent.

Ultraviolet absorption spectra showed an increase in absorption of the samples baked in air while samples baked in a nitrogen environment showed no significant changes.

Example 4

The procedure set forth for Example 2 was followed except that di-chloro-di-p-xylene was deposited on a glass substrate. The thickness of the resulting coatings ranged from 0.2 micron to 2.4 microns. Adhesion of the 0.2 micron specimen was good prior to baking in that the deposited film was only partially disturbed in the tape test and excellent after baking. Adhesion of the 2.4 microns specimen was poor before and good after baking.

Example 5

The procedure set forth in Example 1 was followed except that degreased aluminum and copper samples were used as the substrate. In both instances, adhesion prior to baking was judged good in that the deposited layer was only partially disturbed in the tape test and excellent after baking.

Example 6

Degreased aluminum, brass and copper samples and ammonia cleaned quartz samples were deposition coated with $\alpha,\alpha,\alpha',\alpha'$-perfluoro-p-xylylene polymers to a coating thickness up to about 0.5 micron. Representative samples were reserved as controls and the remainder baked in a vacuum for two hours at 160° C. All samples were tested in the manner set forth in Example 1. Adhesion to aluminum, brass and copper was found to be good prior to baking and excellent after baking. Adhesion to quartz was found to be poor prior to baking and excellent after baking.

What is claimed is:
1. A process which comprises
  (a) condensing vaporous para-xylylene diradicals onto the surface of a solid substrate maintained at a temperature below 200° C. while maintaining a diradical partial pressure below 1 mm. Hg for a period of time sufficient to form a linear para-xylylene polymer coating of a thickness up to about 5 microns on said substrate,
  (b) thereafter maintaining the para-xylylene polymer coated substrate at a temperature of from about 100° to 200° C. for at least 0.25 hour.

2. A process as claimed in claim 1 in which the para-xylylene polymer is deposited to a thickness up to about 2.5 microns.

3. A process as claimed in claim 1 which includes the additional step of confining the para-xylylene polymer coated substrate in a non-oxidizing atmosphere after the para-xylylene polymer is deposited thereon and during the period of time said coated substrate is maintained at a temperature of about 100° C. to 200° C.

4. A process as claimed in claim 3 in which the non-oxidizing atmosphere is nitrogen.

5. A process which comprises
 (a) condensing vaporous para-xylylene diradicals onto the surface of a solid substrate maintained at a temperature below 200° C. while maintaining a diradical partial pressure below 1 mm. Hg for a period of time sufficient to form a linear para-xylylene polymer coating of a thickness up to about 5 microns on said substrate,
 (b) thereafter maintaining the para-xylylene polymer coated substrate at a temperature of from about 100° C. to 200° C. under reduced pressure conditions for at least 0.25 hour.

6. A process as claimed in claim 5 in which the para-xylylene polymer coating is deposited to a thickness up to about 2.5 microns.

7. A process as claimed in claim 5 in which the reduced pressure is less than about 0.01 mm. Hg.

8. A process as claimed in claim 5 in which the reduced pressure is less than about 0.001 mm. Hg.

References Cited

UNITED STATES PATENTS 3,349,045  10/1967  Gilch _____ 117—106X
3,379,803  4/1968   Tittmann et al. _____ 117—106

ALFRED L. LEAVITT, Primary Examiner

W. E. BALL, Assistant Examiner

U.S. Cl. X.R.
117—119, 119.8

PO-1050
(5/69)

UNITED STATES PATENT OFFICE
CERTIFICATE OF CORRECTION

Patent No. 3,573,968      Dated April 6, 1971

Inventor(s) William E. Loeb & Harold B. Robinson, Jr.

It is certified that error appears in the above-identified patent and that said Letters Patent are hereby corrected as shown below:

Column 1, line 68, after "temperature" insert -- of from about 100°C. to 200°C. for at least 0.25 hour. --.
Column 4, line 23, insert "bonding" before -- was --;
line 32, change "exploded" to -- explored -- and insert -- to -- after "found". Column 5, line 42, after "alternate insert -- procedure --; line 43 after "from" insert -- th line 44, change "latter" to --later--; line 46, cancel "i Signed and sealed this 12th day of October, 1971.

(SEAL)
Attest:

EDWARD M. FLETCHER, JR.      ROBERT GOTTSCHALK
Attesting Officer      Acting Commissioner of Paten